US 8,254,882 B2

(12) United States Patent
Cam-Winget et al.

(10) Patent No.: US 8,254,882 B2
(45) Date of Patent: Aug. 28, 2012

(54) INTRUSION PREVENTION SYSTEM FOR WIRELESS NETWORKS

(75) Inventors: Nancy Cam-Winget, Mountain View, CA (US); Mark Krischer, Pymble (AU); Robert B. O'Hara, Jr., Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 575 days.

(21) Appl. No.: 11/668,206

(22) Filed: Jan. 29, 2007

(65) Prior Publication Data

US 2008/0184331 A1 Jul. 31, 2008

(51) Int. Cl.
*H04L 9/00* (2006.01)
(52) U.S. Cl. ............... 455/410; 455/411; 726/1; 726/14
(58) Field of Classification Search .................. 370/328; 726/1, 14, 23; 455/410, 411
See application file for complete search history.

(56) References Cited

U.S. PATENT DOCUMENTS

| | | | | |
|---|---|---|---|---|
| 2002/0174335 A1* | 11/2002 | Zhang et al. | ................... | 713/168 |
| 2003/0219008 A1* | 11/2003 | Hrastar | ........................ | 370/352 |
| 2005/0015624 A1 | 1/2005 | Ginter et al. | | |
| 2005/0037733 A1* | 2/2005 | Coleman et al. | ............... | 455/411 |
| 2005/0086465 A1* | 4/2005 | Sapkota et al. | ................ | 713/150 |
| 2005/0141498 A1 | 6/2005 | Cam Winget | | |
| 2006/0253703 A1* | 11/2006 | Eronen et al. | .................. | 713/156 |

OTHER PUBLICATIONS

PCT Notification of International Search Report and Written Opinion of the International Searching Authority; PCT/US08/51605 dated May 23, 2008.
http://www.techfaq.com/wireless-networks/rsn-robust-secure-network.shtml, "What is RSN (Robust Secure Network)?", Sep. 2, 2004.
http://www.eetimes.com/printableArticle.jhtml?doc_ids_OEG20021126S0003&_requestids=..., "Diving into the 802.11iSpec: A Tutorial", Sep. 2, 2004.
Office Action for Chinese Patent Application No. 200880003064.X, Sep. 23, 2011.

* cited by examiner

*Primary Examiner* — Dwayne Bost
*Assistant Examiner* — William F Rideout
(74) *Attorney, Agent, or Firm* — Baker Botts L.L.P.

(57) ABSTRACT

In one embodiment, a method includes receiving security context information relevant to a connection between a wireless network infrastructure component and a wireless client, wherein the security context information comprises at least, an identification of the wireless client, and wherein the security context information identifies any security protocols associated with the connection; validating the connection based on the security context information; and transmitting the security context information to one or more detector wireless access points.

17 Claims, 8 Drawing Sheets

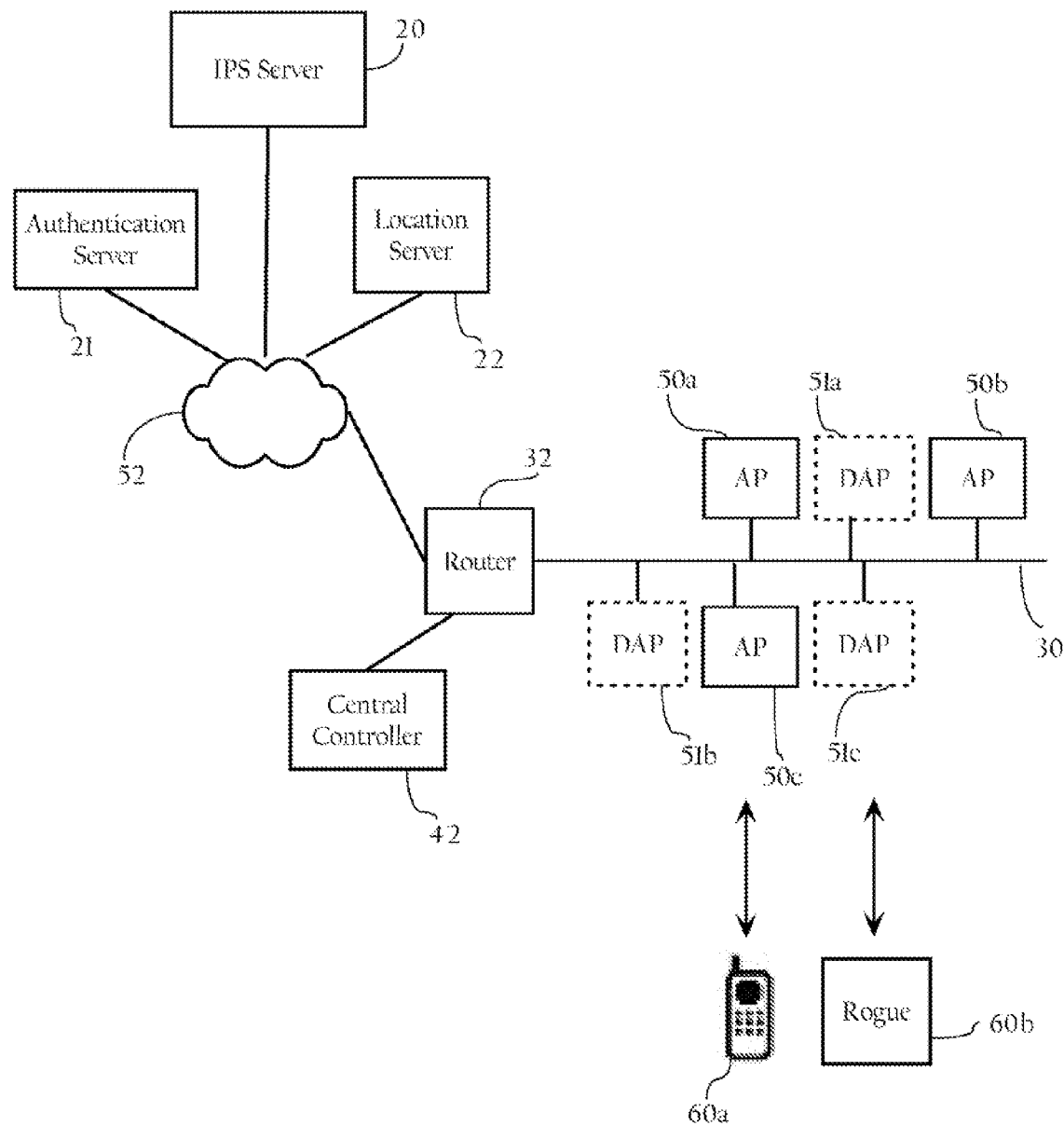
Fig._1A

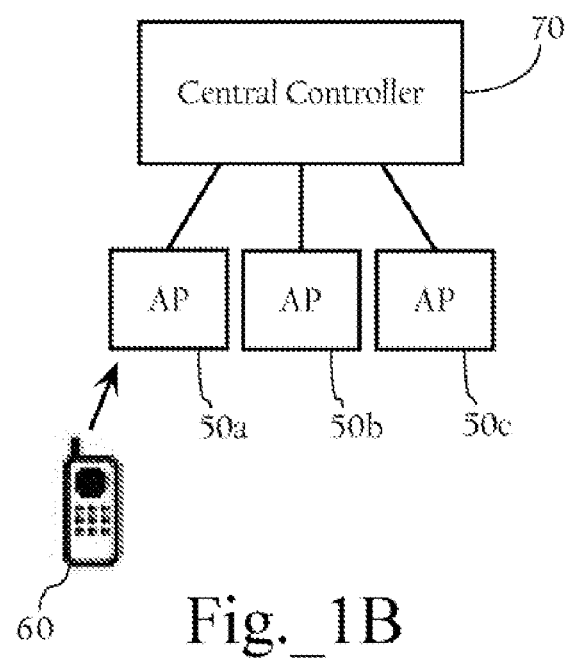
Fig._1B
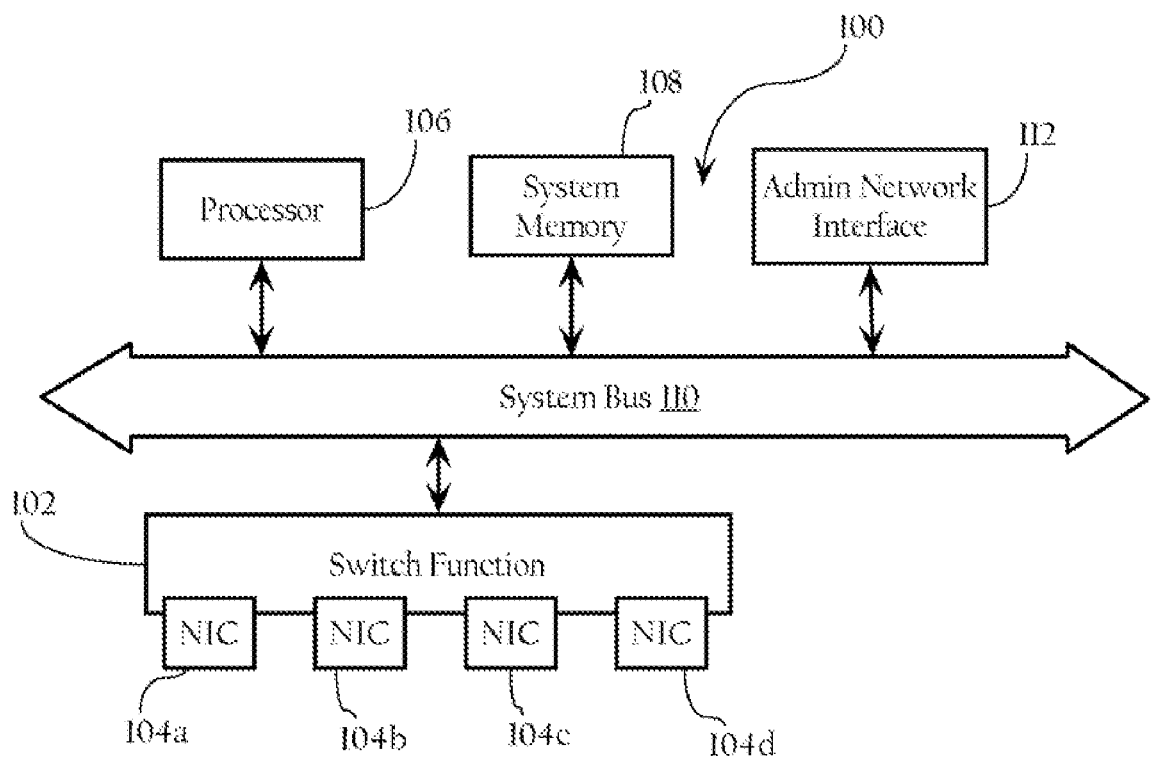
Fig._1C

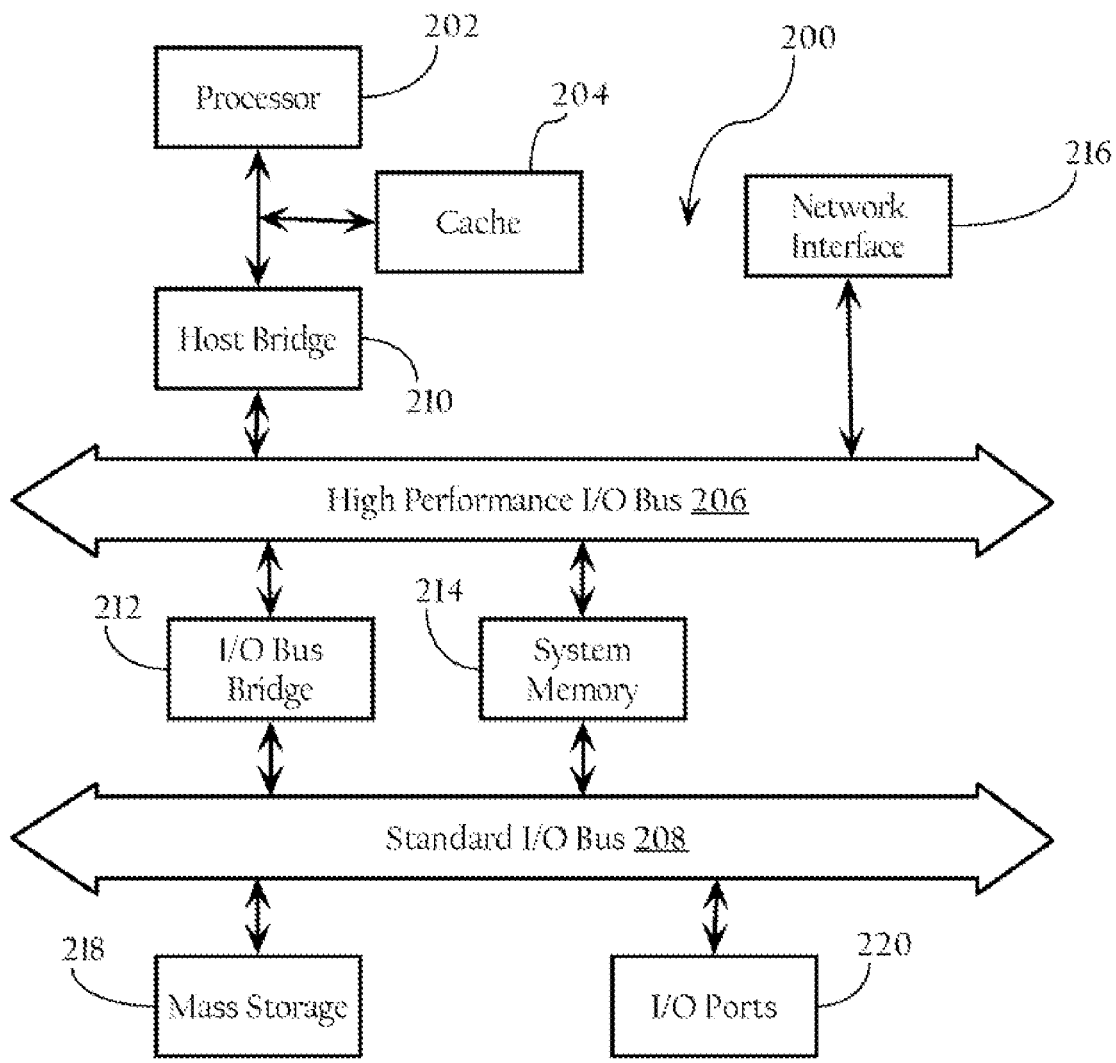
Fig._2

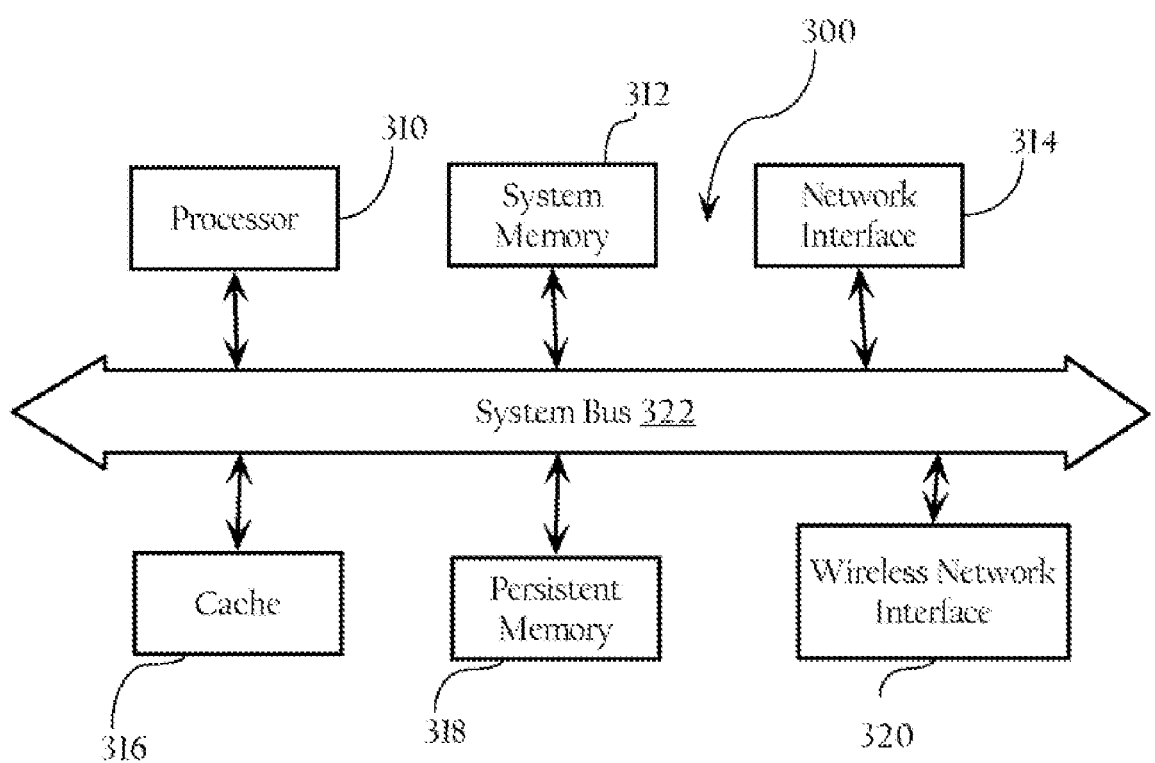
Fig._3

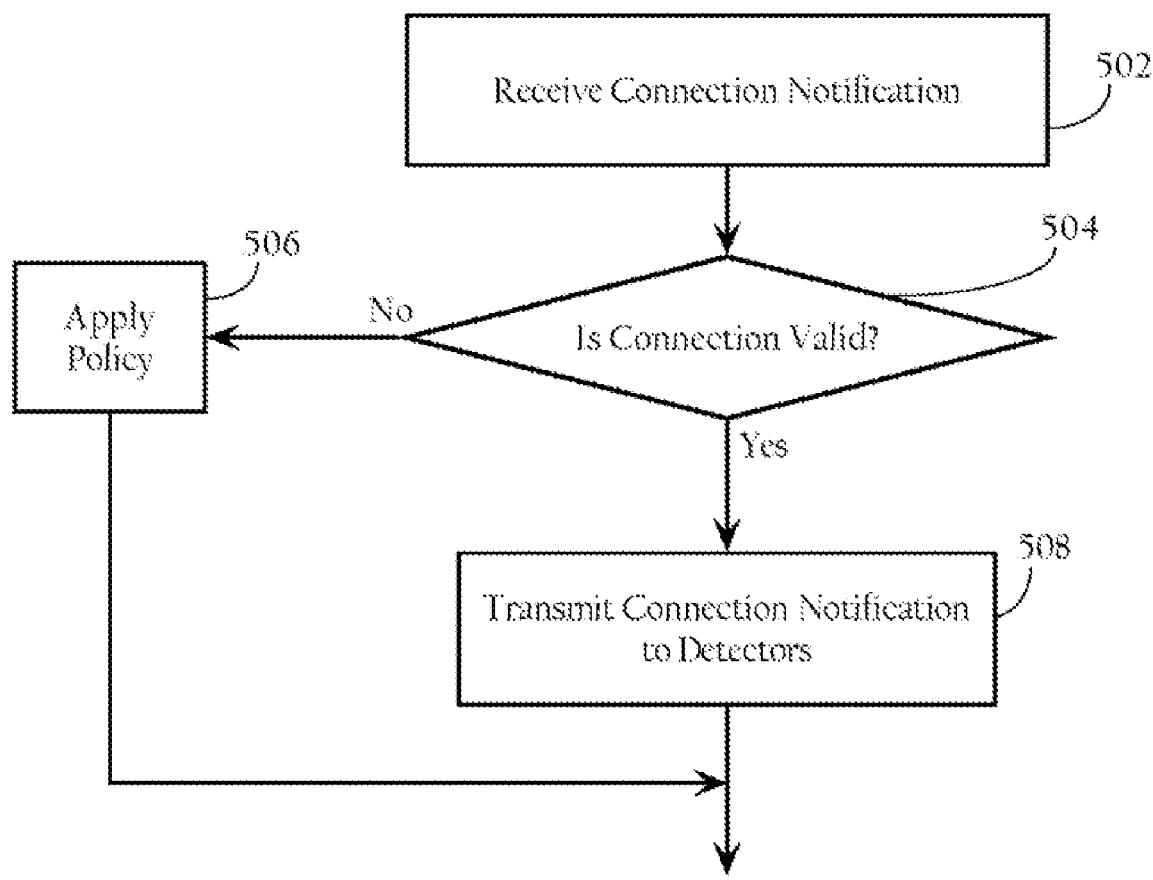
Fig._5

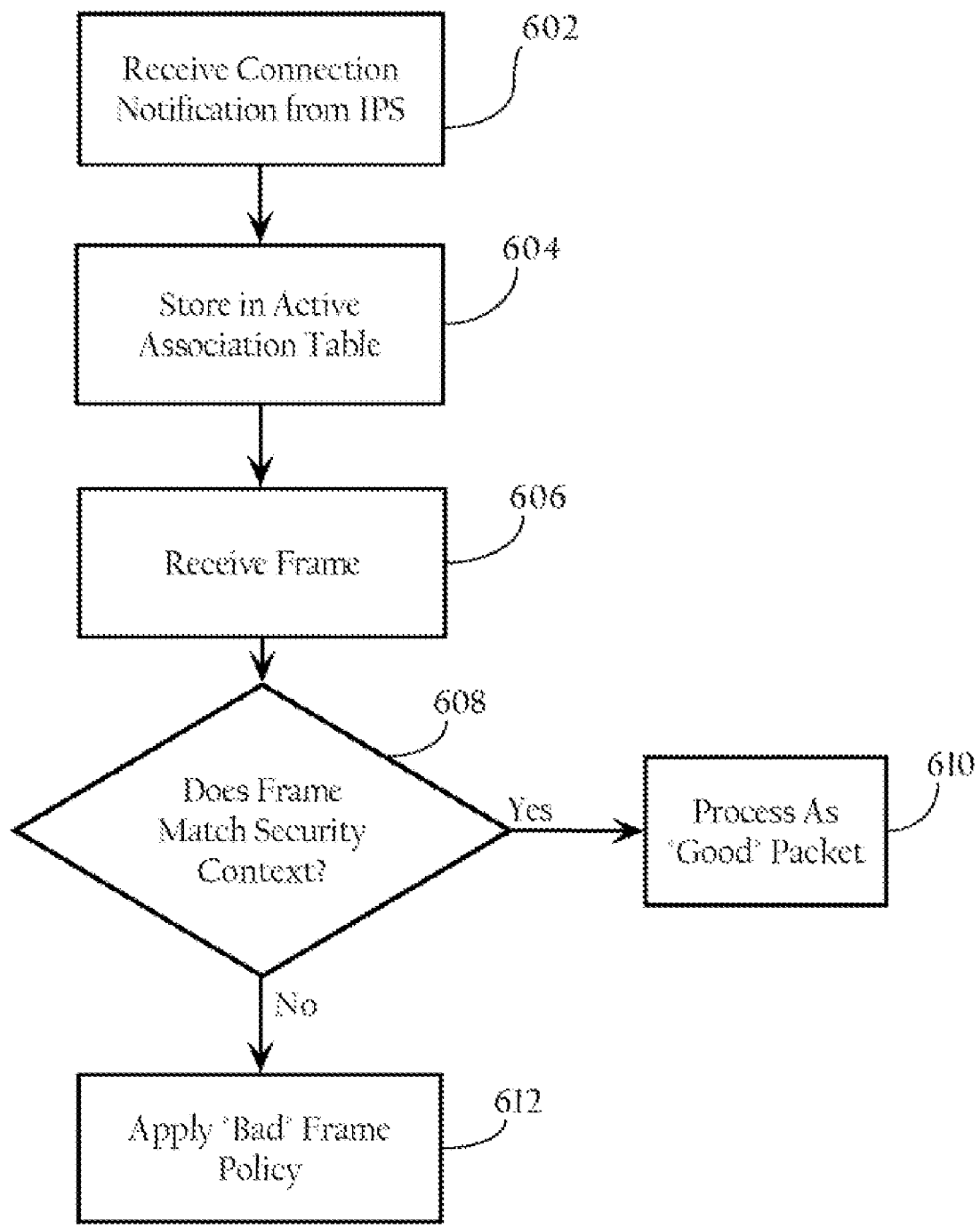
Fig._6

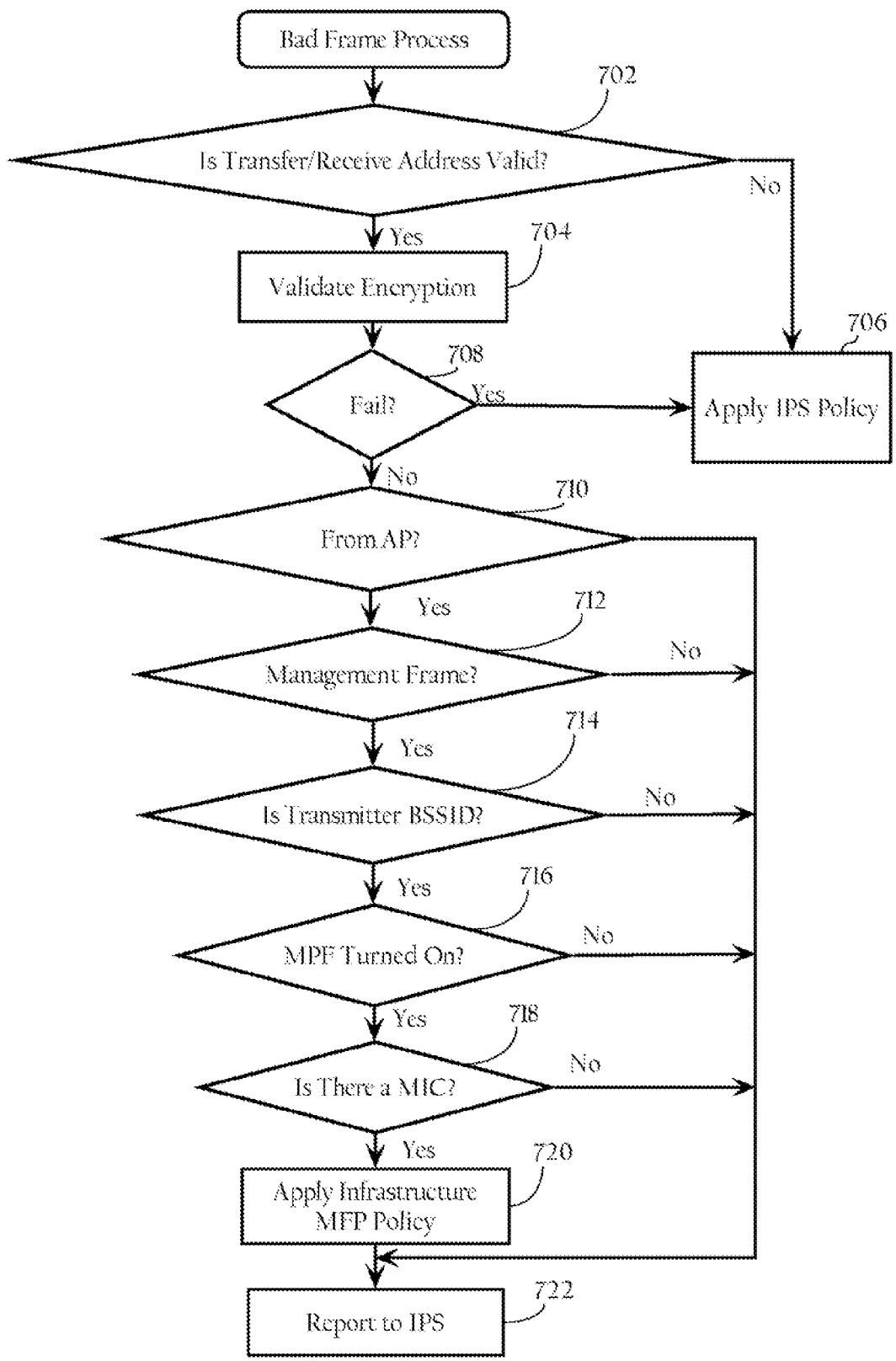
Fig. _7

INTRUSION PREVENTION SYSTEM FOR WIRELESS NETWORKS

TECHNICAL FIELD

This disclosure relates generally to wireless networks.

BACKGROUND

Market, adoption of wireless LAN (WLAN) technology has exploded, as users from a wide range of backgrounds and vertical industries have brought this technology into their homes, offices, and increasingly into the public air space. This Inflection point has highlighted not only the limitations of ear her-generation systems, but also the changing role that WLAN technology now plays in people's work and lifestyles across the globe. Indeed, WLANs are rapidly changing from convenience networks to business-critical networks. Increasingly, users are depending on WLANs to improve the timeliness and productivity of their communications and applications, and in doing so, require greater visibility, security, management, and performance from their networks.

The IEEE (Institute of Electrical and Electronic Engineers) 802.11 standard provides guidelines for allowing users to wirelessly connect to a network and access basic services provided therein. It has become more evident in recent years that security and controlled access are necessities in light of the large amount of sensitive information that is communicated over networks today.

Traditionally, the security and controlled access efforts of wireless networking, and more specifically of layer 2 and the 802.11 MAC protocol have been directed toward protecting the data content of the transmission and not toward the prevention of session disruption. In other words, prior efforts have only been directed toward protecting the sensitivity of the content of the data transmitted and not toward the protection of the transmission of management frame packets which control session integrity and quality.

Management frame protection (MFP) generally refers to the use of message integrity checks (MICs), typically appended as Information Elements (IEs), in connection with wireless management frames (e.g., beacons, authentication requests, re-association requests, de-authentication requests, disassociation requests, etc.) transmitted by access points and/or wireless clients. There are generally two approaches to management frame protection (MFP). The first approach detects possible attacks. This approach is purely infrastructure based, in that scanning wireless access points observe communication exchanges between other (data) wireless access points and wireless clients in order to detect spoofed management frames. Access points include a signature, such as a message integrity check, with their management frames in a manner that enables neighboring access points to be able to validate the management frames, and to detect spoofed frames. When a neighboring access point receives a management frame, obtains a key for the access point sending the frame, and validates the management frame using the key.

A second approach prevents attacks. This approach is wireless access point-wireless client based in that a given wireless access point and a wireless client validate each other's management frames (e.g., validate media access control (MAC) addresses) using message integrity checks (MICs) appended to the wireless management frames. During association and authentication to the network, the wireless client and access point exchange one or more MFP session keys that can be used to generate and validate MICs that are appended to wireless management frames.

Given the different approaches to these methods, they are considered mutually exclusive to the extent that if a wireless client is MFP-client protected, the management frames to that wireless client will not also be MFP-infrastructure protected. That is, because they do not have the keys generated between the access points and the clients, scanning wireless access points cannot analyze the content of the exchanges (such as the MICs) due to the management-frame protection mechanisms. While the prevention approach is effectively stronger, it loses some of the advantages of the detection approach in that it cannot make use of additional scanning wireless access points.

DESCRIPTION OF THE DRAWINGS

FIG. 1A illustrates example components in a wireless local area network (WLAN) system.

FIG. 1B illustrates an example hierarchical wireless network including a central controller.

FIG. 1C illustrates an example hardware system, which may be used to
implement a central controller, FIG. 2 illustrates an example hardware system, which may be used to implement an intrusion prevention system (IPS) server.

FIG. 3 illustrates an example hardware system, which may be used to implement a wireless access point.

FIG. 5 illustrates an example method implemented by the IPS, FIG. 6 illustrates an example method implemented at a detector wireless access point.

FIG. 7 illustrates an example method implemented at the wireless access point.

DESCRIPTION OF EXAMPLE EMBODIMENTS

A. Overview

Figure 4:
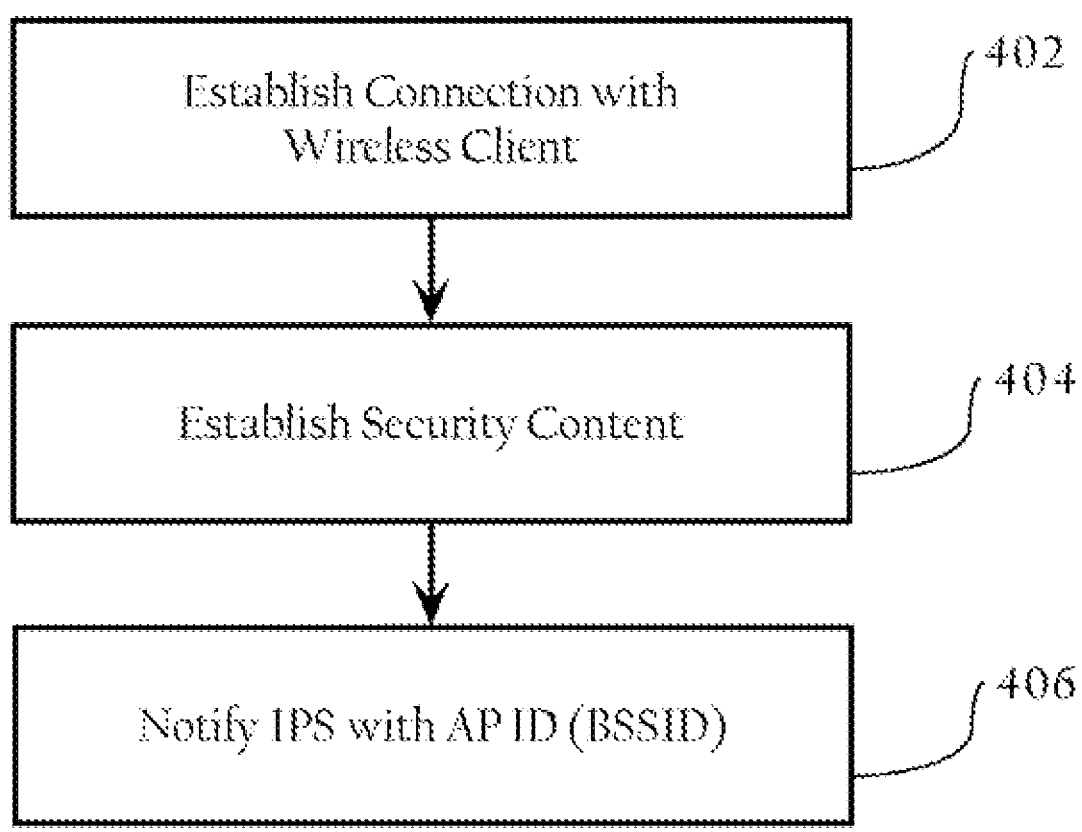
FIG. 4 illustrates an example method implemented by the wireless network infrastructure.

Particular embodiments of the present invention provide an intrusion protection system (IPS) where the IPS and detector wireless access points exchange security context information relevant, to communications between the wireless network infrastructure and specific wireless clients. In one implementation, a wireless network infrastructure determines the security context information, which may include the wireless access point identification (e.g., BSSID), wireless client identification (e.g., MAC address), and also identifies any security protocols used in the connection or communication exchange between the wireless network infrastructure and the wireless client. The wireless network infrastructure then transmits the security context information to the IPS. The IPS can determine if the connection between the wireless network infrastructure and the wireless client is valid based on the security context information and then may apply an appropriate policy (e.g., deny or accept the connection). The IPS then transmits the security context information to detector wireless access points. Based on the security context information, a given detector wireless access point, may analyze and validate unencrypted frames as well as decrypt and analyze the contents of encrypted frames. As such, the detector wireless access point can more optimally filter communication exchanges based on the security context information and transmit reports back to the IPS and appropriate data wireless access points. In one implementation, the detector wireless access point may transmit sample frames to a data wireless access point, so that the data wireless access point can determine if the frames are legitimate.

B. Example Wireless Network System Architecture

B.1. Network Topology

FIG. 1A illustrates example components in a wireless local area network (WLAN) system. In a specific embodiment of the present invention, the system includes a intrusion prevention system (IPS) server 20, an Authentication Authorization and Account (AAA) server 21, a location server 22, a central controller 42, a local area network (LAN) 30, a router 32, and data wireless access points 50a, 50b, and 50c, and detector wireless access points 51a, 51b, and 51c. LAN 30 is implemented by a switch (or an array of switches) and/or other network devices, such as a bridge.

In one implementation, detector wireless access points 51 may be part of an overlay network that is separate from the data network. In one implementation, detector wireless access points 51 are a specialized set of wireless access points that function as detectors. In one implementation, detector wireless access points 51 may also be the same as data wireless access points 50 but with separate logical functions for intrusion prevention.

As FIG. 1A illustrates, these network elements are operably connected to a network 52. Network 52, in one implementation, generally refers to a computer network, such as a LAN, a WAN, etc., that includes one or more intermediate network devices (e.g., routers, switches, etc.), which allow for the transmission of messages between IPS server 20 and wireless clients via wireless access points 50. Of course, network 52 can include a variety of network segments, transmission technologies and components, such as terrestrial WAN links, satellite links, optical fiber links, and cellular links. Network 52 could also he a campus LAN. LAN 30 may be a LAN, LAN segments implemented by an Ethernet switch (not shown), or an array of switches having multiple ports to which wireless access points 50 are connected. The wireless access points 50 are typically connected to switch ports via Ethernet links; however, other link layer connection protocols or communication means can be employed. FIG. 1A illustrates one possible network environment in which the invention may operate; however, other implementations are possible. For example, although IPS server 20 is illustrated as being on a different LAN or LAN segment, it may be co-located with wireless access points 50.

The wireless access points 50 are operative to wirelessly communicate with remote wireless client devices 60a and 60b. In one implementation, the wireless access points 50 implement the wireless network protocol specified in the IEEE 802.11 WLAN specification; of course, other wireless network protocols may be used. The wireless access points 50 may be autonomous or so-called "fat" wireless access points, or light-weight wireless access points operating in connection with a wireless switch (see FIG. 1B). In addition, the network infrastructure may also include a Wireless LAN Solution Engine (WLSE) or another wireless network management system. In some implementations, the network infrastructure may include one or more Wireless Control System (WCS) nodes operative to manage one or more wireless switches and access points, WLSE and WCS are offered by Cisco Systems, Inc. of San Jose, Calif.

While, in some particular embodiment, the intrusion prevention system (IPS) functionality described herein is a logical function that may reside in the IPS server 20, the IPS functionality may reside in any appropriate wireless network, infrastructure node such as in a central controller, in distributed, autonomous wireless access points, etc,

B.2. Central Controller

FIG. 1B illustrates an example hierarchical wireless network including a central controller 70 according to one implementation of the present invention. In one implementation, the central controller 70 may be implemented as a wireless domain server (WDS) or, alternatively, as a wireless switch. If the central controller 70 is implemented with a WDS, the central controller 70 is operative to communicate with autonomous or so-called "fat" wireless access points. If the central controller 70 is implemented as a wireless switch, the central controller 70 is operative to communicate with fight-weight wireless access points and process wireless protocol and network management information. As FIG. 1B illustrates, a central controller 70 may be directly connected to one or more access points 50. Alternatively, a central controller 43 may be operably connected to one or more access points over a switched and/or routed network environment, as FIG. 1A illustrates.

FIG. 1C illustrates an example hardware system 100, which may be used to implement a central controller 70. As FIG. 1C shows, in one implementation, the central control elements each comprise a switch function or fabric 102 comprising a network interlace 104a (e.g., an Ethernet adapter) for connection to network 52 and network interfaces 104b, 104c, and 104d for connection to wireless access points. This switch function or fabric is implemented to facilitate connection to the access elements. Central controller 70, in one implementation, further comprises a processor 106, a memory 108, one or more software modules stored in memory 108, including instructions for performing the functions described herein, and a system bus 110 operably connecting these components. The central control elements may optionally include an administrative network interface 112 allowing for administrative access for such purposes as configuration and diagnostic access. In other implementations, central controller 70 includes a single network interface.

B.3. Intrusion Prevention System Server

FIG. 2 illustrates an example hardware system 200, which may be used to implement an IPS server 20. In other implementations, the functions of the IPS server 20 may be incorporated into central controller 70. In one implementation, hardware system 200 comprises a processor 202, a cache memory 204, and one or more software applications and drivers directed to the functions described herein. Additionally, hardware system 200 includes a high performance input/output (I/O) bus 206 and a standard I/O bus 208. A host bridge 210 couples processor 202 to high performance I/O bus 206, whereas 170 bus bridge 212 couples the two buses 206 and 208 to each other. A system memory 214 and a network/communication interface 216 couple to bus 206. Hardware system 200 may further include video memory (not shown) and a display device coupled to the video memory. Mass storage 218 and I/O ports 220 couple to bus 208. Hardware system 200 may optionally include a keyboard and pointing device (not shown) coupled to bus 208. Collectively, these elements are intended to represent, a broad category of computer hardware systems, including but not limited to general purpose computer systems based on the Pentium® processor manufactured by Intel Corporation of Santa Clara, Calif., as well as any other suitable processor, The elements of hardware system 200 are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above described functions implemented in the system controller, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures; and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain implementations of the present invention may not require nor include all of the above components. For example, the peripheral devices shown coupled to standard I/O bus 208 may couple to high performance I/O bus 206. In addition, in some implementations only a single bus may exist, with the components of hardware system 200 being coupled to the single bus. Furthermore, hardware system 200 may include additional components, such as additional processors, storage devices, or memories.

As discussed above, in one embodiment, the operations of the IPS server 20 described herein are implemented as a series of software routines run by hardware system 200. These software routines comprise a plurality or series of instructions to he executed, by a processor in a hardware system, such as processor 202. Initially, the series of instructions are stored on a storage device, such as mass storage 218. However, the series of instructions can be stored on any suitable storage medium, such as a diskette, CD-ROM, ROM, EEFROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. According to one embodiment of the present invention, the operating system is the Windows® 95/98/NT/XP operating system, available from Microsoft Corporation of Redmond, Wash. However, the present, invention may be used with other suitable operating systems, such as the Apple Macintosh. Operating System, available from Apple Computer Inc. of Cupertino, Calif., UNIX operating systems, LINUX operating systems, and the like.

B.4. Wireless Access Point

FIG. 3 illustrates an example hardware system 300, which may be used to implement a wireless access point 50. In one implementation, the wireless access point 300 includes a processor 310, a memory 312, a network interface 314 (e.g., an 802.3 interface) for communication with a LAN, a cache 316 for storing WLAN information, a persistent memory 318, a wireless network interface 320 (e.g., an IEEE 802.11 WLAN interface) for wireless communication with one or more wireless clients 60, and a system bus 322 interconnecting these components. The wireless access points 50 may also include software modules (including Dynamic Host Configuration Protocol (DHCP) clients, transparent bridging, Lightweight Access Point Protocol (LWAPP), Cisco® Discovery Protocol (CDP) modules, wireless access point modules, Simple Network Management Protocol (SNMP) functionality, etc., and device drivers (e.g., network and WLAN interface drivers) stored in persistent memory 318 (e.g., a hard disk drive. Hash memory, EEPEOM, etc.). At start up, these software components are loaded into system memory 312 and then accessed and executed by processor 310.

In one implementation, the detector wireless access points may operate to detect frames, filter them against, one or more rules, collect statistics, and pass information to the IPS. Also, the detector wireless access points may involve the same hardware configuration as above. In one implementation, the detector wireless access points may run in promiscuous mode to process and inspect detected wireless frames. Furthermore, in one implementation, the detector wireless access points could filter against the security contexts of the wireless clients.

C. Security Contexts and Integration of IPS

As described in more detail below in connection with FIGS. 4-8, the intrusion prevention system both detects and prevents attacks by more closely integrating management frame protection and intrusion prevention systems, and exchanging security context information relevant to specific wireless clients. As described in more detail below, the wireless network infrastructure transmits security context information to the IPS, which in turn validates the connection and transmits security context information to detector wireless access points. The security context information enables the detector wireless access points to perform intelligent filtering of communication exchanges between the wireless network infrastructure and wireless clients based on the security context information. Filtering detected wireless frames at the detector wireless access points reduces load on other systems, such as IPS servers, as well as false positives, since the detectors can filter out frames that do not raise security issues.

FIG. 4 illustrates an example method implemented by the wireless network infrastructure. As indicated above, any of the following functions may be performed at any appropriate wireless infrastructure node such as a central control, wireless access point, etc. As FIG. 6 shows, the wireless network infrastructure first establishes a connection with a wireless client (402). Next, the wireless network infrastructure and the wireless client establish a security context (404). In one implementation, establishing a security context generally involves the selection and implementation of a wireless security mechanism for the connection between the wireless network infrastructure and the wireless client. As discussed below, for example, the wireless security mechanisms used may range from no security to Wired Equivalent Privacy (WEP), wireless fidelity (Wi-Fi) Protected Access (WPA1 and WPA2), IEEE 802.1x, and the like. In one implementation, the wireless security mechanisms used may include Temporal Key Integrity Protocol (TKIP), which are used in connection with WEP, or Advanced Encryption Standard (AES).

The security context may also involve various options, parameters, attributes, and capabilities (or current configurations) of the wireless access point and the wireless client. For example, in one implementation, the wireless network infrastructure may use an 802.1x key management or Pre-Shared Key (PSK). In one implementation, the wireless network infrastructure may use client management, frame protection (MFP) or infrastructure MFP. In one implementation, client MFP may involve the wireless client and the wireless access point agreeing on a key to protect all of the management frames with message integrity checks (MICs). Infrastructure MFP may involve beacons, probe, and management frames being transmitted from the wireless access point including another MIC.

Next, the wireless network infrastructure notifies the IPS (406). In one implementation, the wireless network infrastructure may inform the IPS of the security context, which may include the wireless client identification (e.g., MAC address, IP address, the EAP identity is was assigned, etc.), wireless access point identification (e.g., BSSID), and identifies one or more attributes of the security context, such as any security protocols used in the communication exchange between the wireless network infrastructure and the wireless client. In one implementation, the wireless network infrastructure may also transmit Access Control List (ACL) information such as virtual LAN (VLAN) ID or Basic Server Set ID (BSSID) to the IPS server. In one implementation, the wireless network infrastructure may also transmit to the IPS 802.11 client MFP session key for protecting the management frames.

FIG. 5 illustrates an example method implemented by the intrusion prevention system (IPS). In one implementation, the IPS functionality resides at the IPS server 20. However, as indicated above, the IPS functionality may reside at any appropriate wireless infrastructure node, such as the central controller 70, a wireless access point 50, etc. As FIG. 5 shows, the IPS first receives connection notification, which includes the security context, information (502).

Next, the IPS determines if the connection is valid (504). For example, if the IPS has recently received security context information for the same wireless client (suggesting that the wireless client is currently connected at another wireless access point), the connection may not be valid. However, this may also suggest that the wireless client has roamed. In one implementation, management frames may include added encryption and signature blocks, where the signature block may validate the management frame to ensure it was sent by an authentic wireless access point or wireless client. If the IPS determines that the connection is not valid, the IPS may then apply an appropriate policy (506). For example, if the IPS does not see a previous security context (e.g., the wireless client is no longer connected to an old wireless access point), the connection may be valid. Accordingly, the IPS may apply a policy that, denies access to the old wireless access point and accepts access to the new wireless access point. If the IPS sees a previous security context, the IPS server may deny network access to the wireless client entirely or via the wireless access point identified in the new security context. In one implementation, the IPS may then log the event and notify a network administrator. In one implementation, the log may be used to develop new attack signatures. In one implementation, generation of such attack signatures may be automated (e.g., generated by the IPS) to enhance the IPS functionality.

In one implementation, if the connection is valid, the IPS transmits the connection notification to the detector wireless access points (508). As indicated above, the connection notification includes the security context, which includes the wireless access point identification, wireless client identification, and identifies any security protocols used in the communication exchange between the wireless network infrastructure and the wireless client. In one implementation, the IPS also transmits cryptographic keys so that the detector wireless access point can observe the contents of the communication exchange during filtering processes and thus more optimally detect and subsequently report problems to the IPS, FIG. 6 illustrates an example method implemented at a detector wireless access point. As FIG. 6 shows, the detection wireless access point 51 first receives a connection notification from the IPS (602). Next, detection wireless access point 51 stores the connection notification information in an active association table (604). In one implementation, the active associate table enables the detection wireless access point to keep track of new incoming traffic and new associations between data access points and wireless clients. The detection wireless access point 51 then receives a frame (606). In one implementation, the detector wireless access point may utilize cryptographic keys received from the IPS to decrypt and observe the contents of the communication exchange. The detector wireless access point 51 then determines if the frame matches the security context information including the BSSID of the wireless access point (608). In one implementation, because the detector wireless access point has the necessary key the detector wireless access point can authenticate the signatures. In one implementation, the detection wireless access point may receive two client MFP keys (i.e., one encryption key and one signing key). If the frame matches the security context information, the detector wireless access point 51 may process the frame as a. "good" packet (610). If there is not a match, detection wireless access point 51 may then apply a policy determined by the IPS (612). For example, detection wireless access point 51 may log the event as a policy violation and report the event to the IPS and/or to the wireless access point 50 to which the data wireless client should be connected. In one implementation, the detector wireless access point may transmit to the data wireless access point sample frames. As described in more detail below in connection with FIG. 7, the data wireless access point could determine if the frames are legitimate.

FIG. 7 illustrates an example method implemented at the wireless access point 50 when a bad frame is detected in the process described above in FIG. 6. As FIG. 7 shows, after the (data) wireless access point receives 50 frames from the detector wireless access point, the wireless access point first determines if the transfer/received address of the wireless client is valid (702), For example, the wireless access point 50 may determine if the cipher suite is correct (e.g., if the frame is protected when It should be protected), if the sequence numbers are correct (e.g., not out-of-order), etc. If the received address is not valid, the wireless access point applies an appropriate policy determined by the IPS (704), If the received address is valid, the wireless access point 50 then validates encryption for both data frames and management frames (706). For example, the wireless access point may identify frame type, determine if the frame is encrypted and/or signed. The wireless access point may also validate the replay counter and the encryption keys. In one implementation, management frames may include added encryption and signature blocks, where the signature block may validate the management frame to ensure it was sent by an authentic wireless access point or wireless client. If encryption validation fails (708), the wireless access point applies an appropriate IPS policy (706)

If the encryption validation does not fail, the frame is from a wireless access point (710), the frame is a management frame (712), the transmitter is the BSSID (712), and the infrastructure MPF is turned on (714), the wireless access point determines if the MIC is present (716). At this point, if the MIC is not present, there is an MFP policy violation, and the wireless access point then applies infrastructure MFP policy as described above (718).

According to the implementations described above, the security context information that the detector wireless access point 51 receives from the IPS enables the detector wireless access point 51 to more accurately accrue information for the IPS (e.g., identify actual attacks) based on the security context, thereby performing more accurate and intelligent filtering with fewer false positives, as well as resulting in better policy enforcement for mixed environments and broader network defense. Intelligent filtering also reduces traffic between the detector wireless access point and the IPS.

The present invention has been explained with reference to specific embodiments. For example, while embodiments of the present invention have been described as operating in connection with IEEE 802.11 networks, the present invention can be used in connection with any suitable wireless network environment. Other embodiments will be evident to those of ordinary skill in the art. It is therefore not intended that the present invention be limited, except as indicated by the appended claims.

What is claimed is:

1. An apparatus comprising:
   one or more processors;
   logic encoded in one or more tangible media for execution and when executed operable to cause one or more processors to:
   receive, at an intrusion prevention system, security context information relevant to a connection between a wireless network infrastructure component and a wireless client, wherein the security context information comprises at least an identification of the wireless client, and wherein the security context information identifies any security protocols associated with the connection and includes at least one cryptographic session key established and used by the wireless network infrastructure component and the wireless client to protect wireless management frames transmitted between the wireless network infrastructure component and the wireless client;
   validate, at the intrusion prevention system, the connection based on the security context information; and
   transmit, if the security context information is validated, the security context information to one or more remote detector wireless access points to allow the one or more detector wireless access points to use the at least one cryptographic session key to validate protected management frames transmitted between the wireless network infrastructure component and the wireless client.

2. The apparatus of claim 1 wherein the plurality of detector wireless access points are operable to perform filter functions based on one or more attributes of the security context information.

3. The apparatus of claim 1 wherein the logic is further operable to validate protected wireless management frames.

4. The apparatus of claim 1 wherein the detector wireless access point is further operable to process received wireless frames based at least in part on the security context.

5. The apparatus of claim 1 wherein the logic is further operable to apply an appropriate policy based on validation of the connection.

6. Logic encoded in one or more tangible media for execution and when executed operable to cause one or more processors to:
   receive, at an intrusion prevention system, security context information relevant to a connection between a wireless network infrastructure component and a wireless client, wherein the security context information comprises at least an identification of the wireless client, and wherein the security context information identifies any security protocols associated with the connection and includes at least one cryptographic session key established and used by the wireless network infrastructure component and the wireless client to protect wireless management frames transmitted between the wireless network infrastructure component and the wireless client;
   validate, at the intrusion prevention system, the connection based on the security context information; and
   transmit, if the security context information is validated, the security context information to one or more remote detector wireless access points to allow the one or more detector wireless access points to use the at least one cryptographic session key to validate protected management frames transmitted between the wireless network infrastructure component and the wireless client.

7. The logic of claim 6 wherein the plurality of detector wireless access points are operable to perform filter functions based on one or more attributes of the security context information.

8. The logic of claim 6 wherein the logic is further operable to validate protected wireless management frames.

9. The logic of claim 6 wherein the detector wireless access point is further operable to process received wireless frames based at least in part on the security context.

10. The logic of claim 6 wherein the logic is further operable to apply an appropriate policy based on validation of the connection.

11. A method comprising:
    receiving, at an intrusion prevention system, security context information relevant to a connection between a wireless network infrastructure component and a wireless client, wherein the security context information comprises at least an identification of the wireless client, and wherein the security context information identifies any security protocols associated with the connection and includes at least one cryptographic session key established and used by the wireless network infrastructure component and the wireless client to protect wireless management frames transmitted between the wireless network infrastructure component and the wireless client;
    validating, at the intrusion prevention system, the connection based on the security context information; and
    transmitting, if the security context information is validated, the security context information to one or more detector wireless access points remote from the intrusion prevention system to allow the one or more detector wireless access points to use the at least one cryptographic session key to validate protected management frames transmitted between the wireless network infrastructure component and the wireless client.

12. The method of claim 11 wherein the plurality of detector wireless access points are operable to perform filter functions based on one or more attributes of the security context information.

13. The method of claim 11 further comprising validating protected wireless management frames.

14. The method of claim 11 further comprising processing received wireless frames based at least in part on the security context.

15. The method of claim 11 further comprising applying an appropriate policy based on validation of the connection.

16. A system comprising:
    an intrusion prevention system (IPS);
    one or more data wireless access points each operative to transmit to the IPS security context information relevant to a connection between the respective data wireless access point and a wireless client, wherein the security context information comprises at least an identification of the wireless client and identifying any security protocols associated with the connection and includes at least one cryptographic session key established and used by the corresponding wireless network access point and the wireless client to protect wireless management frames transmitted between the wireless network access point and the wireless client; and one or more detector wireless access points, remote from the IPS, operative to receive the security context information from the IPS and use the at least one cryptographic session key to validate protected management frames transmitted between the corresponding wireless network access point and the wireless client; and wherein the IPS is operative to receive the security context information from the one or more data wireless access points, validate the connection based on the security context information, and, if validated, transmit the security context information to the one or more detector wireless access points.

17. The system of claim 16 wherein the one or more detector wireless access points are operable to perform filter functions based on one or more attributes of the security context information.

* * * * *